2,911,343

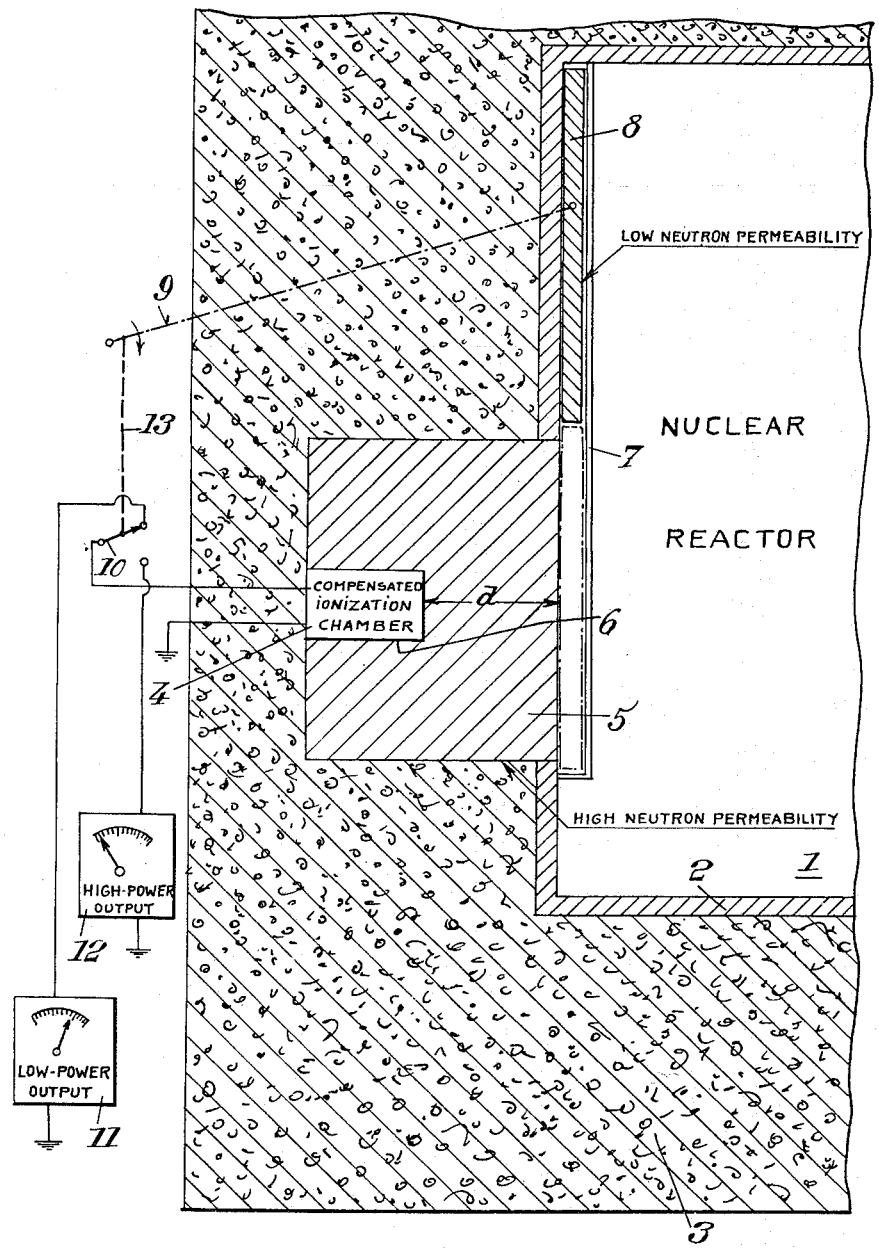

SYSTEM FOR MEASURING NUCLEAR POWER

Paul Louis Braffort, Paris, and Jacky Weill, St. Cloud, France, assignors to Commissariat a l'Energie Atomique, Paris, France, a French society Application May 16, 1955, Serial No. 508,613

Claims priority, application France May 17, 1954

1 Claim. (Cl. 204—193.2)

The present invention relates to a system for measuring nuclear power, such as a device responsive to the power output of an atomic reactor and adapted to make a record of such output, give a visual indication thereof and/or utilize it for control purposes.

It is frequently desirable to measure the power yield of a nuclear reactor, in terms of neutron output, both in its quiescent condition and during normal operation. Such measurements are complicated, however, by the fact that a device sufficiently sensitive and positioned close enough to the reactor to respond to its output in the idle state will almost certainly be destroyed by the considerably larger energy developed when the reactor is taken into use. It would appear that this problem could be solved by displaceably mounting the measuring device in a channel provided in the protective sheath of the reactor and opening toward the exterior thereof, whereby the device could be withdrawn behind dense, neutron-absorbing screens blocking this channel during the high-power operating phase of the reactor. Such arrangements, however, are mechanically complex and difficult to carry into practice.

Another obstacle to the realization of a measuring system adapted to respond to low-power outputs lies in the substantial amount of background gamma radiation which is present after an extended period of operation of the reactor and which tends to falsify the result even if corrective devices known per se, such as a so-called compensated ionization chamber, are used for the measurement.

The present invention has for its object the provision of a measuring system, as hereinabove defined, which avoids the difficulties referred to and which enables accurate determination of the neutron yield of a reactor under the circumstances described.

A feature of this invention resides in the provision of a suitable measuring device, such as conventional cloud chamber or ionization chamber, preferably of the aforementioned compensated type, positioned behind a fixed screen of a material having a relatively high massive absorption coefficient for gamma rays but a relatively low effective cross section so far as the absorption of neutrons is concerned. In combination therewith the invention provides a second, movable screen having a relatively high effective cross section for the absorption of neutrons, the latter screen being interposed between the measuring device and the reactor proper in the latter's high-power stage of operation and being removed in the low-power stage, thus when the reactor is idle. It is further contemplated to provide the measuring device with two output means, such as a pair of different meter scales, for high-power and low-power output indication, respectively.

Boron and cadmium may be mentioned among the materials adapted to be used for the removable screen. Since, however, it is desirable that both screens be made of materials which will give rise to substantially no secondary gamma radiation, boron is preferred inasmuch as cadmium produces 8,000,000 electron-volts of gamma rays for every neutron absorbed. As the massive absorption of gamma rays increases with the atomic weight of the absorbing medium, the fixed screen should advantageously consist of a material having an atomic weight above 200, such as bismuth, lead, etc. Bismuth is preferred in this class of materials since, in its natural state, it has the least effective cross section for the absorption of neutrons.

The invention will be described in greater details with reference to the accompanying drawing whose sole figure shows, diagrammatically and by way of example, a nuclear reactor provided with a measuring system embodying the invention.

The reactor 1, which may be, for example, of the graphite-moderated type, is suitably enclosed in a protective sheath or envelope comprising an inner jacket 2 of iron and an outer shield 3 of concrete.

The measuring device associated with the reactor proper comprises an ionization chamber 4 embedded in a recess 6 of a photon-absorbing fixed screen 5, e.g. of bismuth, separating the chamber 4 from the reactor core. It will be noted that the iron jacket 2 is omitted at the screen 5 so as to expose the latter directly to reactor's radiation.

The output means of the measuring device have been shown, schematically and by way of example, as comprising a first meter 11 for low-power output and a second meter 12 for high-power output, the two meters being selectively connectable to the ionization chamber 4 by means of a switch 10. A neutron-absorbing screen 8, guided by a rail 7 for movement between a retracted position (full lines) and an operative position (dot-dash lines), is displaceable by suitable remote-control means indicated schematically at 9. Also indicated schematically is a link 13 whereby the movable screen 8, which may be of boron, is synchronized with the switch 10 so as to activate the low-power meter 11 in its retracted position and the high-power meter 12 in its operated position. Meters 11 and 12 are, of course, properly calibrated to take into account the absence or the presence, respectively, of screen 8 in the neutron path from the reactor to the measuring chamber 4.

The purpose of screen 5 is to minimize or even to eliminate the effect of gamma rays upon the output of chamber 4, especially in the idle or low-power condition of the reactor. The dimensions of this screen may be determined on the basis of the following considerations:

The material of screen 5, e.g. bismuth, has a known absorption coefficient for gamma rays on the one hand and for neutrons on the other. The total absorption rate for either type of radiation is a function of the effective depth $d$ of the screen in the region of the ionization chamber. The latter has a predetermined photon/neutron sensitivity ratio (which may be of the order of $\frac{1}{100}$ in the case of an ordinary boron-charged chamber and of the order of $\frac{1}{10000}$ in the case of a compensated chamber) which, together with the known flux ratio of gamma radiation and neutrons impinging from the reactor upon the bismuth screen, determines the minimum permissible depth $d$ of the screen. This depth may have a value of the order of 20 to 50 cm. or more.

Considerably smaller thicknesses or depths are sufficient for the boron screen 8, e.g. of the order of a fraction of a millimeter. The necessary mobility of this screen may, therefore, be easily attained.

The invention is, of course, not limited to the specific embodiment described and illustrated but may be modified in various ways, as will be readily apparent to persons skilled in the art in the light of the present disclosure,

What we claim is:

In a nuclear plant, in combination, a reactor, a shield surrounding said reactor, an ionization chamber measuring means mounted in fixed position within said shield sensitive to radiations emanating from said reactor, a screen fixed within said shield so as to be interposed between said reactor and said measuring means, said fixed screen being made of a material capable of absorbing gamma rays while being of relatively high permeability to neutrons, whereby gamma rays from said reactor are permanently prevented from acting upon said measuring means, another screen located within the space limited by the external surface of said shield, said second mentioned screen being mounted movable with respect to said shield so as to be able to occupy either a position where it lies across the path of said radiations between said reactor and said ionization chamber measuring means or a position outside of said path, said second mentioned screen being made of a material of relatively low permeability to neutrons, means operative from outside of said shield for shifting said second mentioned screen from one of its positions to the other, whereby it is possible either to let the neutron flux from said reactor to flow practically without interference onto said measuring means or to reduce the flux of neutrons from said reactor to said measuring means, said measuring means being provided with first and second output means calibrated to determine the reactor output for either of said positions of said second mentioned screen respectively, said first and second output means being operable exclusively of each other.

References Cited in the file of this patent

UNITED STATES PATENTS

| | | |
|---|---|---|
| 2,522,522 | Krasnow | Sept. 19, 1950 |
| 2,708,656 | Fermi et al. | May 17, 1955 |
| 2,719,823 | Zinn | Oct. 4, 1955 |
| 2,763,788 | Herzog | Sept. 18, 1956 |
| 2,785,314 | Grahame | Mar. 12, 1957 |

OTHER REFERENCES

Pile Neutron Research, D. J. Hughes, publ. by Addison-Wesley Publ. Co., Cambridge 42, Mass., 1953; pp. 148, 234, 235, 273, 229, 230, 231, 156–159.